United States Patent [19]

Hekal

[11] Patent Number: 4,771,935
[45] Date of Patent: Sep. 20, 1988

[54] PLASTIC CONTAINERS EMBODYING A PEEL SEAL AND METHOD OF PREPARING SAME

[75] Inventor: Ihab M. Hekal, Stamford, Conn.

[73] Assignee: Continental Can Company, Inc., Norwalk, Conn.

[21] Appl. No.: 57,148

[22] Filed: Jun. 3, 1987

Related U.S. Application Data

[63] Continuation of Ser. No. 751,693, Jul. 3, 1985, abandoned.

[51] Int. Cl.[4] .............................................. B65D 1/34
[52] U.S. Cl. .................... 229/3.5 R; 156/334; 206/484.2; 229/123.1; 229/125.35
[58] Field of Search ............ 229/3.5 R, 43, 48 T; 206/484, 484.2, 631; 156/334

[56] References Cited

U.S. PATENT DOCUMENTS

| | | | |
|---|---|---|---|
| 4,046,945 | 9/1977 | Baxmann et al. | 156/334 |
| 4,198,369 | 4/1980 | Yoshikawa et al. | 215/341 |
| 4,211,811 | 7/1980 | Bordini et al. | 156/334 |
| 4,221,696 | 9/1980 | Cook et al. | 156/334 |
| 4,258,855 | 3/1981 | Gordon | 220/8 |
| 4,358,493 | 11/1982 | Ohtsuki et al. | 156/334 |
| 4,689,099 | 8/1987 | Ito et al. | 229/43 |

FOREIGN PATENT DOCUMENTS

| | | | |
|---|---|---|---|
| 745983 | 11/1966 | Canada | 156/334 |
| 620399 | 1/1963 | Belgium | 156/334 |
| 55-135183 | 10/1980 | Japan | 156/334 |

Primary Examiner—Stephen Marcus
Assistant Examiner—Gary E. Elkins
Attorney, Agent, or Firm—Paul Shapiro

[57] ABSTRACT

A polyolefin container is disclosed which is hermetically sealed with a complementary lid extending across the open container the opposed faces of the container surface and the lid being bonded together by a peelable, heat seal layer intermediate between the opposed faces. The heat seal layer is comprised of a mixture of a particulate filler and first and second polyolefin resins, the second polyolefin resin having a melt flow rate at least about three times greater than the melt flow rate of the first polyolefin resin.

19 Claims, 1 Drawing Sheet

PLASTIC CONTAINERS EMBODYING A PEEL SEAL AND METHOD OF PREPARING SAME

This is a continuation of application Ser. No. 751,693, filed on July 3, 1985 and now abandoned.

BACKGROUND OF THE INVENTION

1. Field of the Invention

This invention relates to a thermally processable plastic container for foodstuffs which are susceptible to oxidative deterioration and more particularly to such a container having a peelable, abuse resistant lid.

2. The Prior Art

In recent years the food packaging industry has shown intense interest in the concept of plastic container packed foods which among other advantages do not require freezing for their preservation and can therefore dispense with costly energy intensive refrigerated transportation and storage facilities. Much effort has gone into the development of a rigid or semi-rigid retortable or autoclavable plastic food containers which in addition to withstanding the rigors of sterilization and later reheating and provide gas and moisture barrier properties which are sufficient to adequately protect the contents during storage, can also be effectively hermetically sealed with a lid which is readily peelable from the container without tearing or rupturing of the packaging materials. With respect to the peelable opening feature, as a simple matter of convenience, it is desirable that the food container be operable by manually pulling the lid from the container instead of relying on a knife, scissors, or tear tab to open the package.

Among the materials which have been investigated for use in the manufacture of the food container just described are laminated films of polyolefins such as polyethylene, polypropylene and copolymers thereof such as ethylene-propylene copolymers. The permeability of the laminated polyolefin films to gases is lowered by the incorporation in the laminated film structure of an inner layer of a gas barrier film such as a vinylidene chloride polymer (e.g. saran) or a hydrolyzed ethylene/vinyl acetate copolymer. Containers are manufactured from these laminated films, to which the desired shape is imparted, for example, by thermoforming. The container bodies generally possess a base and a sidewall which extends upwards from this base, thus forming a type of tray or tube of cylindrical, truncated-cone, square, rectangular or even polygonal shape, depending on the nature of the article to be packaged.

The containers are hermetically sealed by means of a protective cover or lid. For this purpose, the sidewall of the container terminates at its upper end in a radially outwardly directed flat flange, the lid being placed flat on the polyolefin flange surface and sealed under high pressure (e.g. 60 psi) and high temperature (e.g. 300° C.).

Hitherto, aluminum foils of at least 0.10 mil thickness or laminates consisting of such an aluminum foil and one or more thermoplastic films such as polyethylene or polypropylene have been used as lid materials. The aluminum foil surface to be heat sealed to the polyolefin flange is provided with a heat activatable bond promoting layer which allows the foil to be heat sealed to the flange. Adhesive coating layer compositions which have been studied for bonding the aluminum foil layer to the polyolefin flange include epoxy resins, ethylene-vinyl acetate copolymer and a carboxyl modified polypropylene such as the maleic anhydride adduct of an ethylene-propylene copolymer, one of which, Morprime (Morton Chemical, Division of Morton Norwich Products, Inc.) has been cleared for use in food packaging by the Federal Drug Administration and is commercially available.

Heating sealing of the adhesive coated aluminum foil lid to the polyolefin container flange is generally sufficient to ensure that the package remains hermetically sealed during normal handling and during transportation and storage.

Although heat sealing of the aluminum foil lid to the polyolefin container flange through the heat activatable bond promoting layer is highly effective for bonding the lid to the flange, it has been determined upon further experimentation, that the strength of the heat seal exceeds the tensile strength of the materials used for the fabrication of the lid so that when removal of the heat sealed lid is attempted, a portion of the lid adheres to the flange surface with the result that the surface of the flange in the heat seal area has an unesthetic, rough and jagged appearance which is undesirable from the standpoint of consumer appeal. Further, because of the high strength bond, the force required to effect removal of the closure is too high for widespread consumer acceptance.

If it is attempted to weaken the heat seal to obtain a hermetically sealed container in which the lid can be readily opened, or peeled easily from the container flange, there results a seal of insufficient mechanical strength so that the package can be accidentally opened when dropped from a height or when subjected to abuse during normal handling and shipment.

It is therefore an object of the invention to provide a peelable, hermetically sealed thermally processable polyolefin plastic food container.

It is a further object of the present invention to provide a hermetically sealed polyolefin food container which can be peelably sealed and which can withstand accidental opening when dropped from a height or subjected to mechanical abuse during handling and transportation.

According to the present invention there is provided a method of manufacturing a polyolefin container which can be hermetically sealed with a lid which can be peeled open, which method comprises interposing between the lid and the container surface to be sealed an intermediate layer comprising a mixture of a particulate filler and first and second polyolefin resins, the second polyolefin resin having a melt flow rate of at least 3 times greater than the melt flow rate of the first polyolefin resin and then applying heat and pressure to form a hermetic seal.

The combination of particulate filler and polyolefin resin materials of different melt flow rates produces an intermediate heat seal layer in which the cohesive strength of the intermediate layer is less than bond strength of the heat seal so that when it is attempted to separate the lid from the container, the cohesive failure of the intermediate layer permits the lid to be readily peeled away from the container surface to which it had been originally heat sealed.

In mechanical abuse tests, containers hermetically heat sealed in accordance with the method of the present invention and then retort processed were found to withstand accidental opening under conditions which satisfy United States Department of Agriculture (USDA) mechanical abuse specifications for food containers.

DETAILED DESCRIPTION OF THE INVENTION

In accordance with the present invention the container may be fabricated from one or more polyolefin materials or multilayer sheet structures made by lamination of the individual layers utilizing one of the prior art methods of coextrusion or by laminating together separately formed sheets of the individual polyolefin layers.

In such laminated structures the outer polyolefin layers may be from about 10 to about 60 mils thick and are preferably from about 15 to about 30 mils thick. By the term "polyolefin" as used herein is meant polyethylene, polypropylene and random copolymers of ethylene and/or propylene with less than 50% by weight of other olefinically unsaturated monomer or block copolymers of ethylene and propylene with less than 50% by weight of the other copolymer.

To prepare a food container having reduced permeation to gases, a layer of an extrudable gas barrier synthetic resin is incorporated in the laminated structure as an inner barrier layer.

A wide variety of extrudable barrier resins may be employed as the inner barrier layer in accordance with the present invention. Particularly suited as gas barrier layers are extrudable vinylidene chloride polymers and ethylene vinyl alcohol copolymers. The requirement for the inner barrier layer is that the material be laminated to another polymer layer and that the laminate have the desired gas barrier characteristics. Particularly advantageous and beneficial are extrudable compositions of vinylidene chloride polymers, wherein the polymers contain at least 70 weight percent vinylidene chloride, the remainder being one or more olefinically unsaturated monomers copolymerizable therewith such as vinyl chloride. Ethylene vinyl alcohol copolymers are derived from hydrolyzed ethylene vinyl acetate copolymers containing from 15 to 65 mole percent ethylene and 85 to 35 mole percent of vinyl acetate.

The inner gas barrier layer of the laminate structure may be from about 0.2 to about 3.5 about mils in thickness and is most advantageously from about 1.0 to about 2.5 mils thick. The inner gas barrier layer is adhered to the outer polyolefin layers by an adhesive layer which may vary in thickness from about 0.2 to about 0.4 mils, however, generally the preferred adhesive layer thickness is about 0.25 to about 0.35 mils. Ethylene vinyl acetate copolymers are typically used as adhesive layers.

In preparing the intermediate heat seal layer used in the practice of the present invention peelable, the first polyolefin resin used to prepare the intermediate heat seal layer composition comprises about 45 to about 60 percent by weight of the intermediate layer composition and preferably about 40 to about 55% by weight of the composition. The first polyolefin resin has a melt flow rate in the range of about 3 to about 8 dg/min. at 230° C. and preferably about 4 to 6 dg/min. at 230° C.

The second polyolefin resin used to prepare the intermediate heat seal layer of the present invention comprises about 10 to about 40 percent by weight of the intermediate layer composition and preferably about 15 to about 30 percent by weight of the composition. The second polyolefin resin has a melt flow rate in the range of about 15 to about 50 dg/min at 230° C. and preferably about 20 to about 30 dg/min at 230° C.

The term "melt flow rate" is a term of the polymer art and is a measure of the rheological properties of the polymer. Melt flow rate characterizes the processability of the polymers and is also an approximate indication of polymer molecular weight, i.e., the higher the melt flow rate, the lower the molecular weight.

The melt flow rate of polyolefins such as polypropylene is measured normally according to ASTM Test D-1238 (Condition L). In this test, the rate of extrusion in grams per 10 minutes (through an orifice 0.0825 in diameter and 0.315 inch in length) is determined for the polymer at 230° C. in a "dead weight piston plastometer", under the weight of a piston having a diameter of 0.373 inch and weighing in combination with its plunger 2160 grams.

In the manufacture of polyolefin food containers in accordance with the present invention wherein the flange surface of the container is to be heat sealed to a lid through an intermediate peelable heat seal layer, the resin composition of the intermediate heat seal layer is preferably composed of a first polypropylene resin having a melt flow rate of less than about 6 dg/min at 230° C. and generally about 5.0 dg/min at 230° C. and a second polypropylene resin having a melt flow rate of less than about 40 and preferably about 30 dg/min at 230° C.

It is critical to the practice of the present invention that the intermediate layer be composed of a blend of polyolefin resins having widely different melt flow rates. If use is not made of polyolefin resins having differing melt flow rates in the concentrations above specified then the desired combination of peelability and mechanical abuse resistance is no longer obtained. As will hereinafter be illustrated, if the higher melt flow rate polyolefin resin is used in concentrations above those specified above for the preparation of the intermediate layer, the layer is too brittle for practical use. If a less than 40% of the lower melt flow rate resin is used in the preparation of the heat seal layer composition, the peel seal will not pass USDA mechanical abuse tests or will only marginally pass such tests.

The filler incorporated in the intermediate heat seal layer generally comprises about 25 to about 40% of the layer composition and preferably about 30 to about 35 percent by weight. The filler has preferably a laminated structure and is preferably used in a finely divided form, a particle size in the order of 0.1 to 10.0 microns being preferred. Suitable filler materials include silica, talc and mica, with talc being preferred.

Various pigments and colorants may be incorporated in the polyolefin compositions to impart color and/or opacity. Pigments and colorants may be included in the polyolefin compositions at concentrations ranging from about 1 to about 10 percent by weight of the heat seal layer composition.

In the preparation of containers of the present invention, the intermediate heat seal layer can be applied in the form of a thin strip to the lid or container flange or may be a dispersion which can be applied to either the lid surface containing a heat activatable layer or the flange surface of the container. Preferably the intermediate heat seal layer is coextruded as a layer of about 2 to about 10 mils thickness laminated to the polyolefin outer layer of the laminated sheet material from which the container is formed.

In heat sealing the lid to the container any suitable form of sealing can be employed including ultrasonic sealing, induction heating or heat sealing jaws.

DESCRIPTION OF THE DRAWINGS

In the drawings which are attached hereto and made a part of this specification:

As shown in FIGS. 1 and 2 of the drawings the present invention is embodied very generally in a package 10 having an individual laminated container or cup 11 with a central chamber 12 and an outwardly turned horizontal flange 12a to which is heat sealed lid 13.

In FIG. 3, a partial section of the package 10 is shown wherein the container 11 is molded from a multilayer film structure. Lid 13 hermetically seals the container 11. A portion of the lid extends beyond the flange 12a to form a gripping tab area 13a so that the tab can be gripped between the fingers and peeled away from the flange to open the package.

Figure 1:
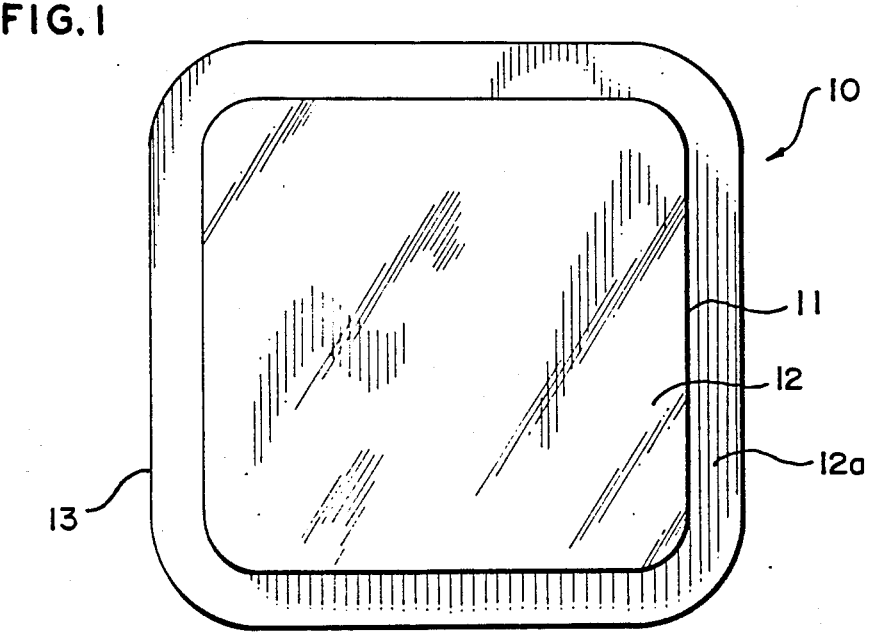
FIG. 1 is a top plan view of a package of the type that may advantageously be sealed according to the present invention.
Figure 2:
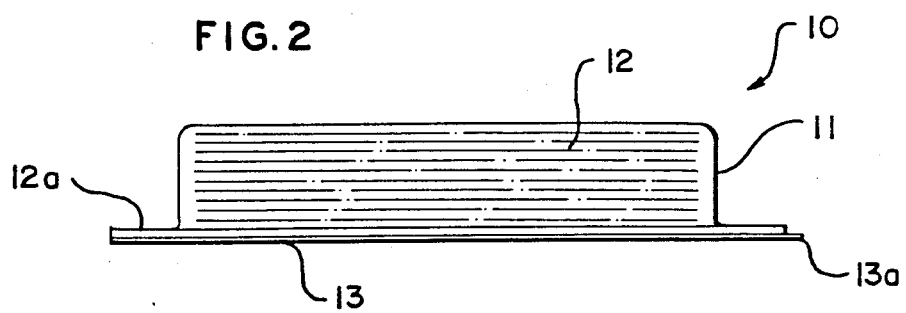
FIG. 2 is a side elevation of the package shown in FIG. 1.
Figure 3:
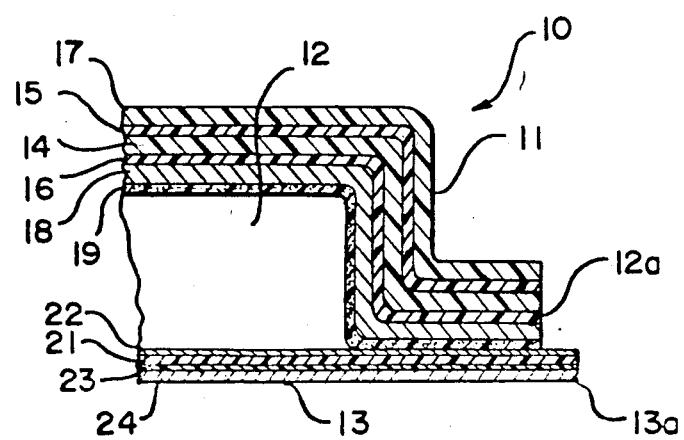
FIG. 3 is a partial section in exaggerated detail showing the various layers of the laminated container structure as well as the surfaces sealed according to the present invention.

The laminated structure of the container 11 is comprised of inner gas barrier core layer 14, thermoplastic adhesive layers 15, 16 juxtaposed on each side of the barrier layer 14, outer polyolefin layers 17 and 18 secured to each of the adhesive layers 15 and 16, and a continuous coherent heat seal layer 19 comprised of high and low melt flow rate polyolefin resins and a particulate filler of the present invention, the heat seal layer being bonded to the polyolefin outer layer 18, which forms the interior, food contact surface of the container 11.

The total thickness of the multilayered structure from which the container 11 is molded ranges in thickness from about 10 to about 100 mils thickness and preferably about 10 to about 40 mils thickness. The heat seal layer 19 can be about 1 to 10 mils thick, the outer polyolefin layers 17, 18 about 10 to 60 mils thick, the gas barrier layer 14 about 0.2 to about 0.35 mils thick and the adhesive layers 15, 16 about 0.25 mils thick.

Heat sealed to the container 11 through the intermediate, peelable heat seal layer 19 is lid 13 comprising an aluminum foil layer 21, inner and outer heat activatable thermoplastic adhesive layers 22 and 23 juxtaposed on each side of the aluminum foil layer 21 and a polyolefin layer 24 bonded to the outer adhesive layer 23. The total thickness of lid ranges from about 15 to about 40 mils thickness and preferably about 10 to about 30 mils thickness. The aluminum foil layer 21 can be about 1 to about 5 mils thick, the inner and outer adhesive layers 21 and 22 about 0.1 to about 0.5 mils thick and the other polyolefin layer bout 25-30 mils thick.

To hermetically seal the container 11, the lid 13 is placed over the exposed heat seal layer 19 on the flange 12a of the container 11, and heat and pressure are applied by the platens of a heat sealing device such as an induction heater, to form a hermetic seal. During the heat sealing operation, the polyolefin material of the heat seal layer 19 is bonded to the heat activatable surface layer 22 of the lid 13. The seal container is sufficiently rigid to maintain its shape during normal handling.

In the practice of the present invention optimum results are obtained when the neat source used for the heat sealing operation is applied to the package part which is opposite the surface to which the heat seal layer is applied.

Although the heat sealing operation results in an hermetically sealed container, the lid 13, even after exposure to thermal processing, can be readily and smoothly separated by hand without tearing of either the lid 13 or the flange 12a by grasping the lid 13 by tab 13a and peeling it off the flange. The heat seal layer 19 in the area of the heat seal is reduced in thickness as the lid 13 is peeled from the flange 12a, as a portion of the heat seal layer 19 is separated and removed from the flange surface as the lid 13 is peeled back. This ease of the separation is obtained because the cohesive strength of the heat seal layer 19 is considerably less than the tensile strength of the bond between the surface of the heat seal layer 19 and the surface of the the heat activatable layer 22 of the lid 13. Examination of the parted lid surface indicates a continuous bed of heat seal material 19 adhered to the heat activatable underside layer 22 of the lid 13.

In the manner described above polyolefin containers are obtained which, although hermetically sealed, are easily peelable to open by hand by the user without recourse to scissors or other tools. The sealed containers although peelably openable may be retorted without premature opening, do not accidently open when dropped from a height two feet or more and do not accidently open when subjected to the normal mechanical abuse encountered during transportation and storage.

The invention is illustrated by the following Example:

EXAMPLE

A laminated sheet was prepared by coextrusion of a first heat sealable layer composed of a mixture of 55% by weight of a polypropylene having a melt flow rate of 5, 15% by weight of a polypropylene having a melt flow rate of 30, 25% by weight of talc having a particle size of 2 microns and 5% $TiO_2$ having a particle size of 1 micron. The heat seal layer was bonded to one of the two outer layers of the sheet which were composed of propropylene. An inner barrier layer composed of 82 weight percent vinylidene chloride and 18 weight percent vinyl chloride was interposed between the outer polypropylene layers and bonded thereto by adhesive layers comprised of an ethylene-vinyl acetate copolymer containing 28 weight percent vinyl acetate. The outer polypropylene layer on one side of the laminated sheet was pigmented with 8% by weight brown pigment and the other outer polypropylene layer which formed the interior food contact surface was pigmented with 6% by weight $TiO_2$. The heat seal layer was bonded to the $TiO_2$ pigmented polypropylene layer. The heat seal layer was 5 mils thick. The outer layers were 20 mils thick, the inner gas barrier layer was 2.2 mils thick and the adhesive layers were each 0.25 mil thick. The individual layers were coextruded from a conventional extruder through a flat sheet die, the melt streams being combined in a coextrusion block prior to being extruded from the die.

The multilayer coextrudate was thermoformed into 6.5"×5.0"×1.0" trays, with the heat seal layer forming the food contact side of the tray, using conventional thermoforming equipment.

A complementary lid was prepared by coating opposite surfaces of a 1.5 mil thick film of aluminum foil with a 0.2 mil thick coating of Morprime, a commercially available adhesive promoting dispersion containing a maleic anhydride modified polypropylene. After application of the Morprime, the coated aluminum foil was baked at 180° C. to volatilize the solvent and fused to coolesce the dispersed particles into a continuous film. Thereafter, a 23 mil thick film of $TiO_2$ pigmented polypropylene was extrusion coated on one side of the Morprime coated aluminum foil.

The lid was used to hermetically seal the thermoformed trays filled with water by heat sealing the Morprime coated surface of the lid to the flanged surface of the trays. The lid container assembly was placed between the jaws of an induction sealer and heat sealed at 300° C., 60 psi for 0.3 seconds using a TOCCO 50 KW/10 KHz induction heater.

1.0 inch strips were cut from the lid and induction heat sealed to a similar sized strip cut from the laminated sheet from which the container was thermoformed. The T-Peel value i.e., the force required to separate the heat sealed layers, was measured on an Instron tensile tester which applied a constant strain rate of 2.0 inches per minute on the assembly. The T-Peel value is recorded in the Table below.

The procedure of the Example was repeated except that the amount of talc in the heat seal layer was raised to 30% by weight and the amount of 5 melt flow rate polypropylene was lowered to 50% by weight. The T-Peel value of this heat seal layer is also recorded in the Table below.

The heat sealed water filled trays were subjected to retort processing at 250° F. for 0.5 hours with 0.5 hours required for the retort to reach the 250° F. temperature. When it was attempted to separate the heat sealed lid from the retorted container flange, the lid was easily peelable from the container by hand. Examination of the lid and flange surfaces which had been heat sealed together and subjected to retorting indicated that a portion of the heat sealing layer had been removed with the lid and a portion of the heat seal layer remained on the flange surface indicating that there had been cohesive failure in the heat seal layer.

The ability of the heat sealed container retorted to withstand mechanical abuse was determined in accordance with the following United States Department of Agriculture standardized mechanical abuse tests.

1. Vibration Testing

The sealed container is subjected to vibration on a test apparatus designed to simulate, over a short time period, vibrations which may be encountered by the packages in normal shipping operations. In this test the packages were vibrated for 30 minutes in a vibrator at about 200 cycles per minute.

2. Drop Test (ATM D775-61)

After vibration testing in accordance with ASTM D999-TS the sealed containers filled with 10 ounces of water must survive drops from a height of at least 28 inches onto a hard surface so that the so-called 2-3-5 corner is impacted, dropped again so that the 3-5 edge is impacted, and dropped three more times so that the 5 end, the 2-side and the 3 bottom are in turn, all impacted.

No leaks were detected even after the vibrated containers were dropped from a height of 42 inches.

The procedure of the Example was repeated with the exception that concentrations of high and low melt flow rate resins were varied as well as the concentration of the talc filler. The T-Peel values and the ability of the heat sealed container to withstand a drop of at least 28 inches after being subjected to vibration testing and retorted are recorded in the Table below.

For purposes of contrast the procedure of the Example was repeated with the exception that talc concentrations and of high and low melt flow rate polyproylene resin concentrations and ratios outside the scope of the present invention were used to prepare the heat seal layer. The results of these comparative tests designated by the symbol "C" are also recorded in the Table below.

TABLE

| | COMPOSITION OF HEAT SEAL LAYER | | | | T-PEEL | DROP TEST |
|---|---|---|---|---|---|---|
| | Wt. % Polypropylene | | | | lbs/in | Drop |
| Run No. | Melt Flow Rate 30 | 5 | Wt. % Talc | Wt. % $TiO_2$ | T-Peel lbs/in. | Test |
| 1 | 15 | 55 | 25 | 5 | 10.5–11.5 | 42" Drop No Leaks |
| 2 | 15 | 50 | 30 | 5 | 9.0 | 32" Drop No Leaks |
| 3* | 15 | 55 | 25 | 5 | 9.0 | 42" Drop No Leaks |
| 4* | 15 | 50 | 30 | 5 | 7.5–8.0 | 32" Drop No Leaks |
| 5 | 15 | 45 | 35 | 5 | 8.5 | Leaks Between 28"–32" Drop |
| 6 | 20 | 40 | 35 | 5 | 7.0–8.0 | Leaks Between 28"–32" Drop |
| 7 | 15 | 45 | 35 | 5 | 5.5 | Leaks at 32" Drop |
| $C_1$* | 15 | 10 | 40 | 5 | 3.0 | Leaks at 28" Drop |
| $C_2$ | 25 | 30 | 40 | 5 | 4.5 | Leaks at 28" Drop |
| $C_3$ | 20 | 30 | 35 | 5 | 6.5 | Leaks at 28" Drop |
| $C_4$* | 20 | 35 | 35 | 5 | 6.5 | Leaks at 28" Drop |

*Polypropylene - ethylene - butadiene - copolymer El Pasco 14 C5A Rexene Substitued for polypropylene nomo polymer When it was attempted to prepare the following heat seal compositions following the procedure of the Example, the resultant composition when heat sealed formed a brittle layer which fractured easily and therefore was not subjected to T-Peel or Drop Tests as it was apprent that the material was an obvious failure.

| COMPOSITION OF HEAT SEAL LAYER | | | |
|---|---|---|---|
| Wt. % Polypropylene Melt Flow Rate | | Wt. % | WT. % |
| 30 | 0.6 | Talc | $TiO_2$ |
| 36 | 9 | 45 | 10 |
| 40 | 0 | 50 | 10 |

What is claimed is:

1. A package comprised of a container formed from a structure having a sealing surface formed from a polypropylene resin, the container having a complementary lid, the lid having a contact face and extending across an opening in the container in contact with the sealing surface, the contact face of the lid and sealing surface being opposed and bonded together by an internally cleavable heat seal layer intermediate between the opposed lid contact and sealing surface, the heat seal layer being comprised of a mixture of about 40 to about 55 percent by weight of a first polypropylene resin having a melt flow rate of about 2 to about 8, about 10 to about 25 percent by weight of a second polypropylene resin having a melt flow rate of about 20 to about 60 and about 25 to about 40 percent by weight of a particulate filler.

2. The package of claim 1 herein the particulate filler is talc.

3. The package of claim 1 wherein the first and second polypropylene resins are a polypropylene-ethylene-butadiene copolymer.

4. The package of claim 1 wherein the melt flow rate of the second polypropylene resin is 6 times the melt flow rate of the first polypropylene resin.

5. The package of claim 1 wherein the container is formed from a laminated film structure.

6. The package of claim 5 wherein the laminated film structure is provided with an inner gas barrier layer interposed between the outer polypropylene layers.

7. The package of claim 6 wherein the inner gas barrier layer is formed from a vinylidene chloride polymer.

8. The package of claim 1 wherein the lid is comprised of bonded layers from exterior to interior of a foil of aluminum and a layer of a heat activatable carboxyl modified polypropylene.

9. The package of claim 1 wherein the heat seal layer is an integral part of the container.

10. A method of making a package comprised of a container part heat sealed with a lid having a contact face the container part having a contact face formed from a polypropylene resin, the contact face of the lid and container part being placed in opposed relation to be hermetically heat sealed together, which method comprises applying to at least one of the opposed faces a heat sealable layer in which the cohesive strength of the heat seal layer is less than the tensile strength of the heat seal layer so that the layer cleaves within itself when forces are applied to the parts to pull them apart, the heat seal layer being comprised of a mixture of about 40 to about 55 percent by weight of a first polypropylene resin having a melt flow rate of about 2 to about 8, about 10 to about 25 percent by weight of a second polypropylene resin having a melt flow rate of at about 20 to about 60 and about 25 to about 40 percent by weight of a particulate filler.

11. The method of claim 10 wherein the particulate filler in talc.

12. The method of claim 10 wherein the first and second polypropylene resins are a polypropylene-ethylene-butadiene copolymer.

13. The method of claim 10 wherein the melt flow rate of the second polypropylene resin is 6 times the melt flow rate of the first polypropylene resin.

14. The method of claim 10 wherein the polypropylene container part is formed from a laminated film structure.

15. The method of claim 14 wherein the laminated film structure has an inner gas barrier layer interposed between the outer polypropylene layers.

16. The method of claim 15 wherein the inner gas barrier layer is formed from a vinylidene chloride polymer.

17. The method of claim 10 wherein the lid is comprised of bonded layers from exterior to interior of a foil aluminum and a layer of a heat activatable carboxyl modified polypropylene.

18. The method of claim 10 wherein the heat seal layer is an integral part of the container.

19. The method of claim 10 wherein the heat source for heat sealing is applied to surface opposite the surface to which the heat seal layer is applied.

* * * * *